(12) United States Patent
Simons

(10) Patent No.: US 8,533,086 B1
(45) Date of Patent: Sep. 10, 2013

(54) VARIABLE RATE PAYMENT CARD

(71) Applicant: JPMorgan Chase Bank, N.A., New York, NY (US)

(72) Inventor: Paul Simons, Princeton, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/794,018

(22) Filed: Mar. 11, 2013

Related U.S. Application Data

(63) Continuation of application No. 11/874,561, filed on Oct. 18, 2007, now Pat. No. 8,417,601.

(51) Int. Cl.
G06Q 40/00 (2012.01)

(52) U.S. Cl.
USPC ............................................. 705/35; 705/36

(58) Field of Classification Search
USPC .................................................... 705/35–40
See application file for complete search history.

(56) References Cited

U.S. PATENT DOCUMENTS

| | | |
|---|---|---|
| 2,005,003 A | 6/1935 | Patton et al. |
| 3,634,669 A | 1/1972 | Soumas et al. |
| 3,713,235 A | 1/1973 | Roberts |
| 3,938,090 A | 2/1976 | Borison et al. |
| 3,946,206 A | 3/1976 | Darjany |
| 4,047,033 A | 9/1977 | Malmberg et al. |
| 4,058,220 A | 11/1977 | Torongo et al. |
| D248,203 S | 6/1978 | Morse |
| 4,130,881 A | 12/1978 | Haessler et al. |
| 4,205,780 A | 6/1980 | Burns |
| 4,264,808 A | 4/1981 | Owens et al. |
| 4,321,672 A | 3/1982 | Braun et al. |
| 4,338,587 A | 7/1982 | Chiappetti |
| 4,453,074 A | 6/1984 | Weinstein |
| 4,454,414 A | 6/1984 | Benton |
| 4,465,206 A | 8/1984 | Sorel et al. |

(Continued)

FOREIGN PATENT DOCUMENTS

| | | |
|---|---|---|
| CA | 2293321 | 12/1998 |
| EP | 0843292 | 5/1998 |

(Continued)

OTHER PUBLICATIONS

Stephanie Stoughton, The Gift of Credit, Wash. Post, Dec. 14, 1998, at 3.

(Continued)

*Primary Examiner* — Thu Thao Havan
(74) *Attorney, Agent, or Firm* — Lowenstein Sandler LLP

(57) ABSTRACT

A method of arranging for payment of a purchase includes receiving, from a supplier, agreement to accept a payment from a buyer via use of a payment card having variable payment terms; after a purchase by the buyer from the supplier, assessing the supplier a standard interchange rate; receiving, from the buyer, approval to pay the invoice; and issuing, to the supplier, a rebate, based upon when the approval to pay the invoice was received. the variable payment terms are calculated by: determining a first early payment date; determining a second standard payment date; assessing against the supplier a first percentage of the standard interchange rate if the invoice is approved by the first early payment date; and assessing against the supplier a second percentage of the standard interchange rate if the invoice is approved on or after the second standard payment date.

13 Claims, 1 Drawing Sheet

(56) References Cited

U.S. PATENT DOCUMENTS

| | | | |
|---|---|---|---|
| 4,545,838 | A | 10/1985 | Minkus et al. |
| 4,575,621 | A | 3/1986 | Dreifus |
| 4,582,985 | A | 4/1986 | Lofberg |
| 4,605,844 | A | 8/1986 | Haggan |
| 4,614,861 | A | 9/1986 | Pavlov et al. |
| 4,634,845 | A | 1/1987 | Riley et al. |
| 4,643,452 | A | 2/1987 | Chang et al. |
| 4,650,981 | A | 3/1987 | Foletts |
| 4,689,478 | A | 8/1987 | Hale et al. |
| 4,697,072 | A | 9/1987 | Kawana |
| 4,700,055 | A | 10/1987 | Kashkashian, Jr. |
| 4,701,601 | A | 10/1987 | Francini et al. |
| 4,723,212 | A | 2/1988 | O'Brien et al. |
| 4,746,787 | A | 5/1988 | Okada et al. |
| 4,750,119 | A | 6/1988 | Robertson et al. |
| 4,754,418 | A | 6/1988 | Hara |
| 4,766,293 | A | 8/1988 | Boston |
| 4,766,539 | A | 8/1988 | Fox |
| 4,789,928 | A | 12/1988 | Fujisaki |
| 4,822,985 | A | 4/1989 | Boggan et al. |
| 4,831,242 | A | 5/1989 | Englehardt |
| 4,831,526 | A | 5/1989 | Luchs |
| 4,837,422 | A | 6/1989 | Dethloff et al. |
| 4,845,347 | A | 7/1989 | McCrindle |
| 4,859,837 | A | 8/1989 | Halpern |
| 4,868,376 | A | 9/1989 | Lessin et al. |
| 4,870,259 | A | 9/1989 | Boggan et al. |
| 4,882,675 | A | 11/1989 | Nichtberger et al. |
| 4,897,533 | A | 1/1990 | Lyszczarz |
| D305,887 | S | 2/1990 | Nishimura |
| 4,906,826 | A | 3/1990 | Spencer |
| 4,908,521 | A | 3/1990 | Boggan et al. |
| 4,923,288 | A | 5/1990 | Allen et al. |
| 4,928,001 | A | 5/1990 | Masada |
| 4,941,090 | A | 7/1990 | McCarthy |
| 4,943,707 | A | 7/1990 | Boggan |
| 4,948,174 | A | 8/1990 | Thomson et al. |
| 4,953,085 | A | 8/1990 | Atkins |
| 4,954,985 | A | 9/1990 | Yamazaki |
| 4,961,142 | A | 10/1990 | Elliott et al. |
| 4,968,873 | A | 11/1990 | Dethloff et al. |
| 4,975,840 | A | 12/1990 | DeTore et al. |
| 4,977,501 | A | 12/1990 | Lefevre |
| 4,978,401 | A | 12/1990 | Bonomi |
| 4,992,940 | A | 2/1991 | Dworkin |
| 5,025,372 | A | 6/1991 | Burton et al. |
| 5,049,728 | A | 9/1991 | Rovin |
| 5,054,096 | A | 10/1991 | Beizer |
| 5,055,662 | A | 10/1991 | Hasegawa |
| 5,072,380 | A | 12/1991 | Randelman et al. |
| 5,080,748 | A | 1/1992 | Bonomi |
| 5,095,194 | A | 3/1992 | Barbanell |
| 5,097,115 | A | 3/1992 | Ogasawara et al. |
| 5,117,355 | A | 5/1992 | McCarthy |
| 5,121,945 | A | 6/1992 | Thomson et al. |
| 5,146,068 | A | 9/1992 | Ugawa et al. |
| 5,177,342 | A | 1/1993 | Adams |
| 5,180,901 | A | 1/1993 | Hiramatsu |
| 5,185,697 | A | 2/1993 | Jacobs et al. |
| 5,187,750 | A | 2/1993 | Behera |
| 5,191,522 | A | 3/1993 | Bosco et al. |
| 5,192,947 | A | 3/1993 | Neustein |
| 5,201,010 | A | 4/1993 | Gabriel et al. |
| 5,202,286 | A | 4/1993 | Nakatani |
| 5,202,826 | A | 4/1993 | McCarthy |
| 5,206,488 | A | 4/1993 | Teicher |
| 5,206,803 | A | 4/1993 | Vitagliano |
| 5,214,700 | A | 5/1993 | Pinkas et al. |
| 5,218,631 | A | 6/1993 | Katz |
| 5,237,620 | A | 8/1993 | Deaton |
| 5,247,190 | A | 9/1993 | Friend et al. |
| 5,257,486 | A | 11/1993 | Holmwall |
| 5,276,311 | A | 1/1994 | Hennige |
| 5,287,268 | A | 2/1994 | McCarthy |
| 5,287,269 | A | 2/1994 | Dorrough et al. |
| 5,297,026 | A | 3/1994 | Hoffman |
| 5,311,594 | A | 5/1994 | Penzias |
| 5,326,959 | A | 7/1994 | Perazza |
| 5,326,960 | A | 7/1994 | Tannenbaum |
| 5,328,809 | A | 7/1994 | Holmes et al. |
| 5,339,239 | A | 8/1994 | Manabe et al. |
| 5,349,633 | A | 9/1994 | Katz |
| 5,350,906 | A | 9/1994 | Brody et al. |
| 5,351,187 | A | 9/1994 | Hassett |
| 5,352,877 | A | 10/1994 | Morley |
| 5,359,183 | A | 10/1994 | Skodlar |
| 5,361,062 | A | 11/1994 | Weiss et al. |
| 5,365,575 | A | 11/1994 | Katz |
| 5,382,784 | A | 1/1995 | Eberhardt |
| 5,383,113 | A | 1/1995 | Knight |
| 5,388,165 | A | 2/1995 | Gabriel et al. |
| 5,397,881 | A | 3/1995 | Mannik |
| 5,399,502 | A | 3/1995 | Friend et al. |
| 5,401,827 | A | 3/1995 | Holmes et al. |
| RE34,915 | E | 4/1995 | Nichtberger et al. |
| 5,412,190 | A | 5/1995 | Kopesec et al. |
| 5,412,192 | A | 5/1995 | Hoss |
| 5,424,524 | A | 6/1995 | Ruppert et al. |
| 5,444,794 | A | 8/1995 | Uhland |
| 5,448,471 | A | 9/1995 | Deaton et al. |
| 5,450,477 | A | 9/1995 | Amarant et al. |
| 5,453,601 | A | 9/1995 | Rosen |
| 5,455,407 | A | 10/1995 | Rosen |
| 5,457,305 | A | 10/1995 | Akel et al. |
| 5,459,306 | A | 10/1995 | Stein et al. |
| 5,465,206 | A | 11/1995 | Hilt et al. |
| 5,466,919 | A | 11/1995 | Hovakimian |
| 5,471,669 | A | 11/1995 | Lidman |
| 5,477,038 | A | 12/1995 | Levine et al. |
| 5,477,040 | A | 12/1995 | LaLonde |
| 5,479,494 | A | 12/1995 | Clitherow |
| 5,482,139 | A | 1/1996 | Rivalto |
| 5,483,444 | A | 1/1996 | Malark et al. |
| 5,483,445 | A | 1/1996 | Pickering |
| 5,489,123 | A | 2/1996 | Roshkoff |
| 5,495,981 | A | 3/1996 | Warther |
| 5,500,514 | A | 3/1996 | Veeneman et al. |
| 5,500,890 | A | 3/1996 | Rogge et al. |
| 5,503,891 | A | 4/1996 | Marshall et al. |
| 5,511,114 | A | 4/1996 | Stimson et al. |
| 5,512,654 | A | 4/1996 | Holmes et al. |
| 5,513,102 | A | 4/1996 | Auriemma |
| 5,521,363 | A | 5/1996 | Tannenbaum |
| 5,530,232 | A | 6/1996 | Taylor |
| 5,530,235 | A | 6/1996 | Stefik et al. |
| 5,532,689 | A | 7/1996 | Bueno |
| 5,537,314 | A | 7/1996 | Kanter |
| 5,541,583 | A | 7/1996 | Mandelbaum |
| 5,544,086 | A | 8/1996 | Davis et al. |
| 5,544,246 | A | 8/1996 | Mandelbaum et al. |
| 5,553,120 | A | 9/1996 | Katz |
| 5,577,109 | A | 11/1996 | Stimson et al. |
| 5,578,808 | A | 11/1996 | Taylor |
| 5,581,064 | A | 12/1996 | Riley et al. |
| 5,585,787 | A | 12/1996 | Wallerstein |
| 5,592,560 | A | 1/1997 | Deaton et al. |
| 5,604,542 | A | 2/1997 | Dedrick |
| 5,608,785 | A | 3/1997 | Kasday |
| 5,612,868 | A | 3/1997 | Off |
| 5,617,474 | A | 4/1997 | Ditzig et al. |
| 5,619,558 | A | 4/1997 | Jheeta |
| 5,621,787 | A | 4/1997 | McKoy et al. |
| 5,621,812 | A | 4/1997 | Deaton et al. |
| 5,637,845 | A | 6/1997 | Kolls |
| 5,638,457 | A | 6/1997 | Deaton et al. |
| 5,642,279 | A | 6/1997 | Stone et al. |
| 5,642,485 | A | 6/1997 | Deaton et al. |
| 5,644,723 | A | 7/1997 | Deaton et al. |
| 5,644,727 | A | 7/1997 | Atkins |
| 5,649,114 | A | 7/1997 | Deaton et al. |
| 5,649,117 | A | 7/1997 | Landry |
| 5,653,914 | A | 8/1997 | Holmes et al. |
| 5,659,469 | A | 8/1997 | Deaton et al. |
| 5,659,741 | A | 8/1997 | Eberhardt |

| | | | | | |
|---|---|---|---|---|---|
| 5,664,110 A | 9/1997 | Green et al. | 5,839,113 A | 11/1998 | Federau et al. |
| 5,664,157 A | 9/1997 | Takahira et al. | 5,845,259 A | 12/1998 | West et al. |
| 5,665,953 A | 9/1997 | Mazzamuto | 5,845,260 A | 12/1998 | Nakano et al. |
| 5,672,678 A | 9/1997 | Holmes et al. | 5,852,811 A | 12/1998 | Atkins |
| 5,675,607 A | 10/1997 | Alesio et al. | 5,852,812 A | 12/1998 | Reeder |
| 5,675,662 A | 10/1997 | Deaton et al. | 5,857,079 A | 1/1999 | Claus et al. |
| 5,677,521 A | 10/1997 | Garrou | 5,857,175 A | 1/1999 | Day |
| 5,677,955 A | 10/1997 | Doggett et al. | 5,857,709 A | 1/1999 | Chock |
| 5,680,459 A | 10/1997 | Hook et al. | 5,859,419 A | 1/1999 | Wynn |
| 5,684,291 A | 11/1997 | Taskett | 5,864,609 A | 1/1999 | Cross et al. |
| 5,687,322 A | 11/1997 | Deaton et al. | 5,864,828 A | 1/1999 | Atkins |
| 5,689,100 A | 11/1997 | Carrithers et al. | 5,864,830 A | 1/1999 | Armetta et al. |
| 5,689,650 A | 11/1997 | McClelland et al. | RE36,116 E | 2/1999 | McCarthy |
| 5,692,132 A | 11/1997 | Hogan | 5,870,718 A | 2/1999 | Spector |
| 5,696,907 A | 12/1997 | Tom | 5,870,721 A | 2/1999 | Norris |
| 5,698,837 A | 12/1997 | Furuta | 5,875,437 A | 2/1999 | Atkins |
| 5,699,528 A | 12/1997 | Hogan | 5,883,377 A | 3/1999 | Chapin, Jr. |
| 5,703,344 A | 12/1997 | Bezy et al. | 5,884,278 A | 3/1999 | Powell |
| 5,704,046 A | 12/1997 | Hogan | 5,884,285 A | 3/1999 | Atkins |
| 5,705,798 A | 1/1998 | Tarbox | 5,887,065 A | 3/1999 | Audebert |
| 5,708,422 A | 1/1998 | Blonder et al. | 5,890,138 A | 3/1999 | Godin et al. |
| 5,710,458 A | 1/1998 | Iwasaki | 5,890,140 A | 3/1999 | Clark et al. |
| 5,710,886 A | 1/1998 | Christensen et al. | H1794 H | 4/1999 | Claus |
| 5,710,887 A | 1/1998 | Chelliah | 5,897,620 A | 4/1999 | Walker et al. |
| 5,710,889 A | 1/1998 | Clark et al. | 5,897,621 A | 4/1999 | Boesch et al. |
| 5,715,399 A | 2/1998 | Bezos | 5,901,303 A | 5/1999 | Chew |
| 5,717,925 A | 2/1998 | Harper et al. | 5,905,246 A | 5/1999 | Fajkowski |
| 5,721,768 A | 2/1998 | Stimson et al. | 5,907,142 A | 5/1999 | Kelsey |
| 5,721,781 A | 2/1998 | Deo et al. | 5,907,350 A | 5/1999 | Nemirofsky |
| 5,726,884 A | 3/1998 | Sturgeon et al. | 5,911,135 A | 6/1999 | Atkins |
| 5,728,998 A | 3/1998 | Novis et al. | 5,911,136 A | 6/1999 | Atkins |
| 5,729,693 A | 3/1998 | Holda-Fleck | 5,914,472 A | 6/1999 | Foladare et al. |
| 5,734,154 A | 3/1998 | Jachimowicz et al. | 5,920,629 A | 7/1999 | Rosen |
| 5,734,838 A | 3/1998 | Robinson | 5,920,844 A | 7/1999 | Hotta et al. |
| 5,736,728 A | 4/1998 | Matsubara | 5,920,847 A | 7/1999 | Kolling et al. |
| 5,737,421 A | 4/1998 | Audebert | 5,923,734 A | 7/1999 | Taskett |
| 5,740,549 A | 4/1998 | Reilly et al. | 5,926,800 A | 7/1999 | Baronowski et al. |
| 5,742,775 A | 4/1998 | King | 5,930,217 A | 7/1999 | Kayanuma |
| 5,745,049 A | 4/1998 | Akiyama et al. | 5,931,764 A | 8/1999 | Freeman et al. |
| 5,745,706 A | 4/1998 | Wolfberg et al. | 5,933,817 A | 8/1999 | Hucal |
| 5,749,075 A | 5/1998 | Toader et al. | 5,937,068 A | 8/1999 | Audebert |
| 5,760,381 A | 6/1998 | Stich et al. | 5,940,811 A | 8/1999 | Norris |
| 5,765,138 A | 6/1998 | Aycock et al. | 5,946,669 A | 8/1999 | Polk |
| 5,765,141 A | 6/1998 | Spector | 5,952,641 A | 9/1999 | Korshun |
| 5,770,843 A | 6/1998 | Rose et al. | 5,953,423 A | 9/1999 | Rosen |
| 5,770,849 A | 6/1998 | Novis et al. | 5,953,710 A | 9/1999 | Fleming |
| 5,774,870 A | 6/1998 | Storey | 5,955,961 A | 9/1999 | Wallerstein |
| 5,774,882 A | 6/1998 | Keen | 5,956,695 A | 9/1999 | Carrithers et al. |
| 5,777,305 A | 7/1998 | Smith et al. | 5,963,648 A | 10/1999 | Rosen |
| 5,777,306 A | 7/1998 | Masuda | 5,963,925 A | 10/1999 | Kolling et al. |
| 5,777,903 A | 7/1998 | Piosenka et al. | 5,970,478 A | 10/1999 | Walker et al. |
| 5,778,067 A | 7/1998 | Jones et al. | 5,970,479 A | 10/1999 | Shepherd |
| 5,787,156 A | 7/1998 | Katz | 5,970,480 A | 10/1999 | Kalina |
| 5,787,404 A | 7/1998 | Fernandez-Holman | 5,974,399 A | 10/1999 | Giuliani et al. |
| 5,789,732 A | 8/1998 | McMahon et al. | RE36,365 E | 11/1999 | Levine et al. |
| 5,789,733 A | 8/1998 | Jachimowicz et al. | 5,979,757 A | 11/1999 | Tracy |
| 5,790,636 A | 8/1998 | Marshall | 5,984,180 A | 11/1999 | Albrecht |
| 5,794,207 A | 8/1998 | Walker | 5,984,191 A | 11/1999 | Chapin, Jr. |
| 5,796,827 A | 8/1998 | Coppersmith et al. | 5,987,434 A | 11/1999 | Libman |
| 5,798,950 A | 8/1998 | Fitzgerald | 5,988,509 A | 11/1999 | Taskett |
| 5,799,087 A | 8/1998 | Rosen | 5,991,413 A | 11/1999 | Arditti et al. |
| 5,802,176 A | 9/1998 | Audebert | 5,991,743 A | 11/1999 | Irving et al. |
| 5,805,719 A | 9/1998 | Pare et al. | 5,991,748 A | 11/1999 | Taskett |
| 5,806,042 A | 9/1998 | Kelly et al. | 5,991,750 A | 11/1999 | Watson |
| 5,806,044 A | 9/1998 | Powell | 5,999,596 A | 12/1999 | Walker et al. |
| 5,806,045 A | 9/1998 | Biorge | 6,000,608 A | 12/1999 | Dorf |
| 5,807,627 A | 9/1998 | Friend et al. | 6,000,832 A | 12/1999 | Franklin et al. |
| 5,809,478 A | 9/1998 | Greco | 6,002,383 A | 12/1999 | Shimada |
| 5,814,796 A | 9/1998 | Benson et al. | 6,003,762 A | 12/1999 | Hayashida |
| 5,815,657 A | 9/1998 | Williams et al. | 6,004,681 A | 12/1999 | Epstein et al. |
| 5,815,658 A | 9/1998 | Kuriyama | 6,006,988 A | 12/1999 | Behrmann et al. |
| 5,819,234 A | 10/1998 | Slavin et al. | 6,009,415 A | 12/1999 | Shurling et al. |
| 5,819,237 A | 10/1998 | Garman | 6,014,636 A | 1/2000 | Reeder |
| 5,826,243 A | 10/1998 | Musmanno et al. | 6,014,638 A | 1/2000 | Burge et al. |
| 5,832,090 A | 11/1998 | Raspotnik | 6,014,645 A | 1/2000 | Cunningham |
| 5,832,457 A | 11/1998 | O'Brien | 6,014,749 A | 1/2000 | Gloor et al. |
| 5,832,488 A | 11/1998 | Eberhardt | 6,016,482 A | 1/2000 | Molinari et al. |
| 5,835,061 A | 11/1998 | Stewart | 6,016,954 A | 1/2000 | Abe et al. |
| 5,835,576 A | 11/1998 | Katz | 6,019,284 A | 2/2000 | Freeman et al. |

| | | |
|---|---|---|
| 6,021,189 A | 2/2000 | Vu |
| 6,026,370 A | 2/2000 | Jermyn |
| 6,029,139 A | 2/2000 | Cunningham et al. |
| 6,029,144 A | 2/2000 | Barrett et al. |
| 6,029,890 A | 2/2000 | Austin |
| 6,032,136 A | 2/2000 | Brake et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,360 A | 3/2000 | Picciallo |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,055,573 A | 4/2000 | Gardenswartz et al. |
| 6,058,378 A | 5/2000 | Clark et al. |
| 6,061,660 A | 5/2000 | Eggleston et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,085,976 A | 7/2000 | Sehr |
| 6,089,284 A | 7/2000 | Kaehler et al. |
| 6,091,817 A | 7/2000 | Bertina et al. |
| 6,092,056 A | 7/2000 | Tull, Jr. et al. |
| 6,092,057 A | 7/2000 | Zimmerman et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,911 A | 10/2000 | Fredregill et al. |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christensen et al. |
| RE37,122 E | 4/2001 | Levine et al. |
| 6,213,392 B1 | 4/2001 | Zuppichich |
| 6,222,914 B1 | 4/2001 | McMullin |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 | 7/2001 | Blumberg |
| 6,263,316 B1 | 7/2001 | Khan et al. |
| 6,265,977 B1 | 7/2001 | Vega et al. |
| 6,278,981 B1 | 8/2001 | Dembo et al. |
| 6,289,322 B1 | 9/2001 | Kitchen et al. |
| 6,292,786 B1 | 9/2001 | Deaton et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,315,195 B1 | 11/2001 | Ramachandran |
| 6,324,524 B1 | 11/2001 | Lent et al. |
| 6,324,526 B1 | 11/2001 | Dagostino |
| 6,327,575 B1 | 12/2001 | Katz |
| 6,330,543 B1 | 12/2001 | Kepecs |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,490,568 B1 | 12/2002 | Omara et al. |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,553,113 B1 | 4/2003 | Dhir et al. |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,592,044 B1 | 7/2003 | Wong et al. |
| 6,601,040 B1 | 7/2003 | Kolls |
| 6,601,761 B1 | 8/2003 | Katis |
| 6,607,127 B2 | 8/2003 | Wong |

| | | | | | | |
|---|---|---|---|---|---|---|
| 6,609,111 B1 | 8/2003 | Bell | | 2001/0011227 A1 | 8/2001 | Ashery et al. |
| 6,609,113 B1 | 8/2003 | O'Leary et al. | | 2001/0011243 A1 | 8/2001 | Dembo et al. |
| 6,609,654 B1 | 8/2003 | Anderson et al. | | 2001/0027389 A1 | 10/2001 | Beverina et al. |
| 6,609,658 B1 | 8/2003 | Sehr | | 2001/0027441 A1 | 10/2001 | Wankmueller |
| RE38,255 E | 9/2003 | Levine et al. | | 2001/0034647 A1 | 10/2001 | Marks et al. |
| 6,615,189 B1 | 9/2003 | Phillips et al. | | 2001/0034682 A1 | 10/2001 | Knight et al. |
| 6,615,190 B1 | 9/2003 | Slater | | 2001/0037315 A1 | 11/2001 | Saliba et al. |
| 6,625,582 B2 | 9/2003 | Richman et al. | | 2001/0044293 A1 | 11/2001 | Morgan |
| 6,631,849 B2 | 10/2003 | Blossom | | 2001/0047332 A1 | 11/2001 | Gonen-Friedman et al. |
| 6,641,049 B2 | 11/2003 | Luu | | 2001/0047342 A1 | 11/2001 | Cuervo |
| 6,641,050 B2 | 11/2003 | Kelley et al. | | 2001/0051917 A1 | 12/2001 | Bissonette et al. |
| 6,671,673 B1 | 12/2003 | Baseman et al. | | 2001/0054003 A1 | 12/2001 | Chien et al. |
| D485,573 S | 1/2004 | Li | | 2001/0056398 A1 | 12/2001 | Sceirer |
| 6,675,127 B2 | 1/2004 | LeBlanc et al. | | 2002/0019793 A1 | 2/2002 | Frattalone |
| 6,675,149 B1 | 1/2004 | Ruffin et al. | | 2002/0019803 A1 | 2/2002 | Muller |
| 6,687,222 B1 | 2/2004 | Albert et al. | | 2002/0026418 A1 | 2/2002 | Koppel et al. |
| 6,693,544 B1 | 2/2004 | Hebbecker | | 2002/0032609 A1 | 3/2002 | Wilkman |
| 6,732,919 B2 | 5/2004 | Macklin et al. | | 2002/0046089 A1 | 4/2002 | Zorn |
| D490,840 S | 6/2004 | Arakaki et al. | | 2002/0046255 A1 | 4/2002 | Moore et al. |
| D491,186 S | 6/2004 | Arakaki et al. | | 2002/0059139 A1 | 5/2002 | Evans |
| D491,953 S | 6/2004 | Arakaki et al. | | 2002/0062235 A1 | 5/2002 | Wahlbin et al. |
| 6,742,704 B2 | 6/2004 | Fitzmaurice et al. | | 2002/0062249 A1* | 5/2002 | Iannacci .................. 705/14 |
| 6,745,938 B2 | 6/2004 | Sullivan | | 2002/0065712 A1 | 5/2002 | Kawan et al. |
| 6,757,660 B2 | 6/2004 | Canada et al. | | 2002/0065720 A1 | 5/2002 | Carswell et al. |
| 6,757,710 B2 | 6/2004 | Reed | | 2002/0077964 A1 | 6/2002 | Brody et al. |
| D495,736 S | 9/2004 | Scharf | | 2002/0077978 A1 | 6/2002 | O'Leary et al. |
| D496,365 S | 9/2004 | Liu et al. | | 2002/0082990 A1 | 6/2002 | Jones |
| 6,793,135 B1 | 9/2004 | Ryoo | | 2002/0091572 A1 | 7/2002 | Anderson et al. |
| 6,802,008 B1 | 10/2004 | Ikefuji et al. | | 2002/0091631 A1 | 7/2002 | Usui |
| 6,805,287 B2 | 10/2004 | Bishop | | 2002/0095365 A1 | 7/2002 | Slavin et al. |
| 6,805,288 B2 | 10/2004 | Routehnstein et al. | | 2002/0099586 A1 | 7/2002 | Bladen et al. |
| D498,236 S | 11/2004 | Liu et al. | | 2002/0104878 A1 | 8/2002 | Seifert et al. |
| 6,856,973 B1 | 2/2005 | Bott | | 2002/0111916 A1 | 8/2002 | Coronna et al. |
| 6,865,547 B1 | 3/2005 | Brake et al. | | 2002/0116271 A1 | 8/2002 | Mankoff |
| 6,868,426 B1 | 3/2005 | Mankoff | | 2002/0116330 A1 | 8/2002 | Hed et al. |
| 6,876,971 B1 | 4/2005 | Burke | | 2002/0117541 A1 | 8/2002 | Biggar et al. |
| D505,450 S | 5/2005 | Lauer et al. | | 2002/0120627 A1 | 8/2002 | Mankoff |
| 6,895,383 B2 | 5/2005 | Heinrich | | 2002/0120642 A1 | 8/2002 | Fetherston |
| 6,895,386 B1 | 5/2005 | Bachman et al. | | 2002/0129221 A1 | 9/2002 | Borgin et al. |
| 6,901,372 B1 | 5/2005 | Helzerman | | 2002/0138418 A1 | 9/2002 | Zarin et al. |
| 6,912,502 B1 | 6/2005 | Buddle et al. | | 2002/0143703 A1 | 10/2002 | Razvan et al. |
| 6,945,453 B1 | 9/2005 | Schwarz, Jr. | | 2002/0147662 A1 | 10/2002 | Anderson |
| 6,970,830 B1 | 11/2005 | Samra et al. | | 2002/0156723 A1 | 10/2002 | Lilly et al. |
| 6,978,369 B2 | 12/2005 | Wheeler et al. | | 2002/0165771 A1 | 11/2002 | Walker et al. |
| 6,999,943 B1 | 2/2006 | Johnson et al. | | 2002/0165820 A1 | 11/2002 | Anvekar et al. |
| 7,006,992 B1 | 2/2006 | Packwood | | 2002/0169719 A1 | 11/2002 | Dively et al. |
| 7,051,925 B2 | 5/2006 | Schwarz, Jr. | | 2002/0174016 A1 | 11/2002 | Cuervo |
| 7,072,864 B2 | 7/2006 | Brake et al. | | 2002/0174018 A1 | 11/2002 | Bunger et al. |
| 7,072,909 B2 | 7/2006 | Polk | | 2002/0178025 A1 | 11/2002 | Hansen et al. |
| 7,076,465 B1 | 7/2006 | Blagg et al. | | 2002/0194081 A1 | 12/2002 | Perkowski |
| 7,089,503 B1 | 8/2006 | Bloomquist et al. | | 2003/0004828 A1 | 1/2003 | Epstein |
| 7,092,905 B2 | 8/2006 | Behrenbrinker et al. | | 2003/0018613 A1 | 1/2003 | Oytac |
| 7,092,916 B2 | 8/2006 | Diveley | | 2003/0023549 A1 | 1/2003 | Armes et al. |
| 7,104,443 B1 | 9/2006 | Paul et al. | | 2003/0028483 A1 | 2/2003 | Sanders et al. |
| 7,107,249 B2 | 9/2006 | Diveley | | 2003/0028518 A1 | 2/2003 | Mankoff |
| 7,113,914 B1 | 9/2006 | Spielmann et al. | | 2003/0033211 A1 | 2/2003 | Haines et al. |
| D533,220 S | 12/2006 | Graves et al. | | 2003/0033246 A1 | 2/2003 | Slater |
| 7,165,049 B2 | 1/2007 | Slater | | 2003/0034388 A1 | 2/2003 | Routhenstein et al. |
| D538,349 S | 3/2007 | Hollands | | 2003/0046249 A1 | 3/2003 | Wu |
| 7,216,091 B1 | 5/2007 | Blandina et al. | | 2003/0053609 A1 | 3/2003 | Risafi et al. |
| 7,225,155 B1 | 5/2007 | Polk | | 2003/0074290 A1 | 4/2003 | Clore |
| 7,228,155 B2 | 6/2007 | Saunders | | 2003/0101119 A1 | 5/2003 | Persons et al. |
| 7,243,839 B2 | 7/2007 | Beck et al. | | 2003/0105672 A1 | 6/2003 | Epstein et al. |
| 7,249,092 B2 | 7/2007 | Dunn et al. | | 2003/0110111 A1 | 6/2003 | Nalebuff et al. |
| 7,249,112 B2 | 7/2007 | Berardi et al. | | 2003/0135462 A1 | 7/2003 | Brake, Jr. et al. |
| 7,252,223 B2 | 8/2007 | Schofield | | 2003/0140004 A1 | 7/2003 | O'Leary et al. |
| D551,705 S | 9/2007 | Mershon | | 2003/0144935 A1 | 7/2003 | Sobek |
| 7,295,999 B1 | 11/2007 | Simon et al. | | 2003/0154125 A1 | 8/2003 | Mittal et al. |
| 7,306,141 B1 | 12/2007 | Schwarz, Jr. | | 2003/0163403 A1 | 8/2003 | Chen et al. |
| 7,311,244 B1 | 12/2007 | Schwarz, Jr. | | 2003/0163416 A1 | 8/2003 | Kitahima |
| 7,312,707 B1 | 12/2007 | Bishop et al. | | 2003/0167218 A1 | 9/2003 | Field et al. |
| 7,315,843 B2 | 1/2008 | Diveley et al. | | 2003/0172040 A1 | 9/2003 | Kemper et al. |
| 7,346,567 B2 | 3/2008 | Weeks | | 2003/0187787 A1 | 10/2003 | Freund |
| 7,349,866 B2 | 3/2008 | Schwarz, Jr. | | 2003/0195808 A1 | 10/2003 | Brown et al. |
| 7,392,222 B1 | 6/2008 | Hamilton et al. | | 2003/0200143 A9 | 10/2003 | Walker et al. |
| 7,392,224 B1 | 6/2008 | Bauer et al. | | 2003/0200180 A1 | 10/2003 | Phelan et al. |
| 7,493,288 B2 | 2/2009 | Bishop et al. | | 2003/0204421 A1 | 10/2003 | Houle et al. |
| 7,591,416 B2 | 9/2009 | Blossom | | 2003/0216965 A1 | 11/2003 | Libman |
| 7,775,426 B2 * | 8/2010 | Paul et al. .................. 235/379 | | 2003/0218066 A1 | 11/2003 | Fernandes et al. |

| | | | |
|---|---|---|---|
| 2003/0229525 A1 | 12/2003 | Callahan et al. |
| 2004/0024672 A1 | 2/2004 | Brake, Jr. et al. |
| 2004/0029569 A1 | 2/2004 | Khan et al. |
| 2004/0030626 A1 | 2/2004 | Libman |
| 2004/0039588 A1 | 2/2004 | Libman |
| 2004/0049452 A1 | 3/2004 | Blagg |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duek |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0128195 A1 | 7/2004 | Sorem |
| 2004/0149544 A1 | 8/2004 | Dal Ferro |
| 2004/0155101 A1 | 8/2004 | Royer et al. |
| 2004/0159700 A1 | 8/2004 | Khan et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0232223 A1 | 11/2004 | Beenau et al. |
| 2004/0239481 A1 | 12/2004 | Beenau et al. |
| 2004/0243498 A1 | 12/2004 | Duke |
| 2004/0252012 A1 | 12/2004 | Beenau et al. |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0086160 A1 | 4/2005 | Wong et al. |
| 2005/0091138 A1 | 4/2005 | Awatsu |
| 2005/0102228 A1 | 5/2005 | Srinivasan et al. |
| 2005/0108152 A1 | 5/2005 | Tsao Lee et al. |
| 2005/0116024 A1 | 6/2005 | Beenau et al. |
| 2005/0119979 A1 | 6/2005 | Murashita et al. |
| 2005/0171898 A1 | 8/2005 | Bishop et al. |
| 2005/0199705 A1 | 9/2005 | Beck et al. |
| 2005/0234771 A1 | 10/2005 | Register et al. |
| 2005/0269396 A1 | 12/2005 | Schofield |
| 2006/0026092 A1 | 2/2006 | Klein |
| 2006/0036553 A1 | 2/2006 | Gupta et al. |
| 2006/0041540 A1 | 2/2006 | Shannon et al. |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0085334 A1 | 4/2006 | Murphy |
| 2006/0106696 A1 | 5/2006 | Carlson |
| 2006/0116903 A1 | 6/2006 | Becerra |
| 2006/0122918 A1 | 6/2006 | Graboske et al. |
| 2006/0131869 A1 | 6/2006 | Brignull |
| 2006/0206420 A1 | 9/2006 | Burke |
| 2006/0224480 A1 | 10/2006 | Bent et al. |
| 2006/0242057 A1 | 10/2006 | Velarde |
| 2006/0251478 A1 | 11/2006 | Desmeules |
| 2006/0259364 A1 | 11/2006 | Strock et al. |
| 2007/0061252 A1 | 3/2007 | Burke |
| 2007/0078719 A1 | 4/2007 | Schmitt et al. |
| 2007/0156530 A1 | 7/2007 | Schmitt et al. |
| 2007/0265924 A1 | 11/2007 | Schwarz |
| 2008/0010202 A1 | 1/2008 | Schwarz |
| 2008/0177659 A1 | 7/2008 | Lacey et al. |
| 2009/0043651 A1 | 2/2009 | Schwarz |
| 2009/0150284 A1 | 6/2009 | Burke |
| 2009/0150370 A1 | 6/2009 | Christensen et al. |
| 2009/0177564 A1 | 7/2009 | Burke |

FOREIGN PATENT DOCUMENTS

| | | |
|---|---|---|
| EP | 0855659 | 7/1998 |
| EP | 0959440 | 11/1999 |
| GB | 2275654 | 9/1994 |
| GB | 2376787 | 12/2002 |
| GB | 2377071 | 12/2002 |
| GB | 2377314 | 1/2003 |
| WO | 94/29112 | 12/1994 |
| WO | 97/41673 | 11/1997 |
| WO | 98/59307 | 12/1998 |
| WO | 99/05633 | 2/1999 |
| WO | 99/54841 | 10/1999 |
| WO | 01/18699 | 3/2001 |
| WO | 01/69347 | 9/2001 |
| WO | 2005/043277 | 5/2005 |
| WO | 2008/021381 | 2/2008 |
| WO | 2008/021382 | 2/2008 |

OTHER PUBLICATIONS

SwiftGift, http://www.swiftgiftcard.com/Home_Page (last visited Dec. 8, 1998).

Tania L. Motschman et al, Corrective and preventive action, 21 Transfusion Sci. 163 (1999).

Tee L. Guidotti, Comparing environmental risks: A consultative approach to setting priorities at the community level, 22 Pub. Health Rev. 321 (1994).

The Choice Award, Incentive, Dec. 1996, at 47.

The Electronic Purse Reaches the Car Park, http://docs.vicromnet.com/mobility/parking_vc/Papers_Full%20Documents_AABT004.HTM (last visited Feb. 23, 2001).

The evolution of a new consumerism, Chain Store Age, Jun. 1997, at 8.

Two chips can be better than one, Card Tech., May 2001, at 40.

Valerie Block, Blockbuster Running Test of a Stored Value Card, Am. Banker, Sep. 1, 1995.

Valerie Block, First Data Subsidiary Creates Payroll Card for the Bankless, Am. Banker, Mar. 21, 1997.

Vincent Alonzo, . . . Three if by Smart Card, Incentive, Sep. 1995, at 12.

Visa First to Launch Electronic Purse Load Via GSM Mobile Phone, Apr. 7, 1999, http://www.cellular.co.za/news_1999/news-04071999-visa-gsm.htm (last visited Feb. 23, 2001).

Visa International, Visa Cash—Where to Find, http://www.visa.asia.com/pd/cash/where.html (last visited Feb. 23, 2001).

Visa International, Visa Cash, http://www.visa-asia.com/pd/cash/main.html (last visited Feb. 23, 2001).

Wells Fargo Blazes New Trail for Homeowners, PR Newswire, Oct. 2, 2002, at 1.

Whitman Richards, How to Play Twenty Questions with Nature and Win, A.I. Memo No. 600, Mass. Inst. Tech. Artificial Intelligence Laboratory, Dec. 1982.

Wikipedia, Stored-Value Card, http://en.wikipedia.org/wiki/Stored-value_card (last visited Apr. 16, 2007).

John C. Bogle, Founder & Former Chairman The Vanguard Group, Mutual Funds at the Millennium: Fund Directors and Fund Myths, Remarks to the '40 Act Institute of PLI (Practising Law Institute) (May 15, 2000).

John N. Frank, The Campus Card Conundrum, Card Tech., Feb. 1998, at 25.

Joris Claessens et al, A Tangled Word Wide Web of Security Issues, First Monday, Mar. 2002, http://firstmonday.org/htbin/cgiwrap/bin/ojs/index.php/fm/article/view/935/857.

Judy Quinn, Incentive Cards Explained, Incentive, Dec. 1995, at 52.

Keith Lamond, Credit Carde Transactions Real World and Online, http://www.virtualschool.edu/mon/ElectronicProperty/klamond/credit_card.htm (last visited Jul. 8, 2005).

Kenneth Hein, What's the Deal?, Incentive, Jul. 1998, at 63.

Kenneth R. Hamey, Home Asset Management Accounts Link Mortgages, Equity Lines, Wash. Post, Oct. 5, 2002, at H06.

Kenneth Rossman Inc., Summary Appraisal of Real Property located at West Islip NY, Feb. 15, 2002.

Key Bank, Holiday Offer, http://www.key.com/swiftgift/home.html (last visited Apr. 5, 1999).

Lisa Fickenscher, Amex prepaid offering is latest card for firms rewarding employees, Am. Banker, Aug. 8, 1996, at 11.

Lucy Lazarony, Stuck for a gift? Give a prepaid credit card, http://www.bankrate.com/brm/news/cc/19981221a.asp (Dec. 21, 1998).
M. Granger Morgan et al, Categorizing Risks for Risk Ranking, 20 Risk Analysis 49 (2000).
MailFrontier, MailFrontier Survey Finds that Consumers Hold Financial Institutions Accountable for Online Identity Theft, Nov. 10, 2004.
Marc Langheinrich, Unintrusive customization techniques for Web advertising, 31 Computer Networks 1259 (1999).
Maritz, Exclusively Yours MasterCard (advertisement), Incentive, Jun. 1996.
Maritz, Exclusively Yours MasterCard (advertisement), Incentive, Oct. 1995.
Melinda Norris, First Data Unit Develops Blockbuster Cash Card, Omaha World Herald, Jan. 19, 1996, at 16.
Meridian Enterprises Corp., Incentive Gift Card (advertisement), Incentive, Aug. 1995.
Meridian Enterprises Corp., Paper or Plastic? (advertisement), Incentive, Feb. 1996.
Mickey Meece, Boatmen's Prepaid Cards for Worker-Incentive Firm, Am. Banker, Jul. 2, 1996, at 12.
Miriam Kreinin Souccar, Smart Cards: 1st Union Smart Card Pilot Enlists a Second Army Base, Am. Banker, Mar. 31, 1999, at 16.
More Retailers Turn to Co-Branding, Chain Store Age, Feb. 1, 1995, at 102.
National Research Council, Transportation Research Board, Multi-purpose Transit Payment Media, TCRP Report 32 (1998).
Nick Rosen, Cash just isn't flexible enough, Daily Express, Feb. 10, 1995.
Nora Wood, intel: This high-tech company's sales incentive program motivated top performers to become exceptional sales stars, Incentive, Dec. 1997, at 28.
Nora Wood, The Power of the Card, Incentive, Jul. 1997, at 65.
NTS' TransPay Debit Card Helps remote and Unbanked Employees Get Funds Quicker, PR Newswire, Mar. 18, 1997.
Pam Ottem, RN and LPN accountabilities and responsibilities, Nursing BC, Jun. 1, 2000.
Phil Britt, Competing in auto lending, America's Community Banker, Nov. 1996, at 33.
Press Release, AT&T, New 1-800-CALL-ATT campaign promotes one number for all calls (Feb. 17, 1997).
Press Release, AT&T, Universal Card free lifetime membership extended 3 months (Dec. 4, 1990).
Press Release, VISA International, Consortium Created to Manage Common Electronic Purse Specifications (May 11, 1999), http://www.visa.com/av/news/PRmisc051199.vhtml (last visited Feb. 23, 2001).
Press Release, VISA International, Visa International and SERMEPA Announce Plans for Cross Border Visa Cash Based on CEPS (Nov. 16, 1999), http://www.visa.com/av/news/PRaaamisc111699.vhtml (last visited Feb. 23, 2001).
Press Release, VISA International, Visa Releases Visa Cash Electronic Purse Specifications Based on CEPS (Apr. 20, 1999), http://www.visa.com/av/news/PRaaamisc042099.vhtml (last visited Feb. 23, 2001).
Privacy Committee of New South Wales, Smart Cards: Big Brother's Little Helper, Aug. 1995.
Rachel Konrad, IBM had a bunch of unusual ideas in 2003, Phila. Inquirer, Jan. 13, 2004.
Ralph E. Spurgin, "Sopininmon!" or what's happening in the retail credit card environment?, Credit World, Mar. 1, 1997, at 20.
Robert Brehl, Banks issue cash-card pledge, Toronto Star, Oct. 9, 1997.
Ron Edwards, ATMs—the hot new media buy, ABA Banking J., Mar. 1999, at 58.
S.P. Miller et al, Kerberos Authentication and Authorization System, available at ftp://athena-dist.mit.edu/pub/kerberos/doc/techplan.txt (last visited Oct. 16, 2003).
Saul Hansell, Visa to Unveil 'Electronic Purse' Cards, http://is.gseis.ucla.edu/impact/w95/RN/mar24news/Merc-news-visa.html (last visited Feb. 23, 2001).
Schlumberger Limited, Smart card for Loyalty and E-Purse Applications Eclipses Capability of Conventional Mag-Stripe Cards (press release), http://www.1.slb.com/ir/news/et-micropayflex20497.html (last visited Feb. 23, 2001).
Sharon Machlis et al, Will smart cards replace ATMs?, ComputerWorld, Jul. 30, 1998.
Sharon Machlis, Have it the 'smart' way: Burger King program drives smart-card use, ComputerWorld, Jul. 6, 1998.
SK100 Smart Card Electronic purse Balance reader, http://perso.wanadoo.fr/helene.eleusis/sk100e.htm (last visited Feb. 23, 2001).
Smart Card Industry Association, About Smart Cards, http://www.scia.org/aboutSmartCards/elecpurse.html (last visited Feb. 23, 2001).
Smart Cards: Seizing Strategic Business Opportunities, The Smart Card Forum (Catherine A. Allen & William J. Barr eds., 1997).
SmartAxis bv, http://www.smartaxis.co.uk/homte/index.html (last visited Feb. 23, 2010).
Sora Song, A Card that Asks for ID, Time, Apr. 12, 2004.
Stefani O'Connor, Maritz Gets Mastercard's Stamp of Approval, Bus. Travel News, Aug. 19, 1996, at A1.
A Store Card Issuer Looks for Lift from Electronic Gift Certificates, Credit Card News, Feb. 1, 1995, at 4.
American Express Incentive Services, Incentive, Sep. 1996, at 126.
Anne D. Hotchkiss, ATMs at the head of their class, Bank Marketing, Mar. 1997, at 26.
Antoinette Coulton, Incentives Field Moving to Card-Based Awards Series:14, Am. Banker, Mar. 26, 1998.
Armetta Marketing & Design, Introducing SpendingMoney (Marketing proposal presented to FirstUSA), Oct. 9, 1996.
Associates First Capital Corporation, The Industry Standard, http://www.thestandard.com (last visited Apr. 6, 1999).
AT&T Universal Platinum MasterCard promotional materials, Term & Conditions (1999).
Bamshad Mobasher et al, Creating Adaptive Web Sites Through Usage-Based Clustering of URLs, Proc. Workshop on Knowledge and Data Engineering Exchange (1999).
Bank for Int'l Settlements, Basel Committee on Banking Supervision, Operational Risk Data Collection Exercise—2002 (Jun. 4, 2002).
Beth Piskora, Debit Cards Seen Poised for New Markets, Am. Banker, Mar. 7, 1995, at 16.
Boatmen's Floats Stored Value Into the Employee Incentive Waters, Debit Card News, Jul. 16, 1996.
Card Express, Inc., http://web.archive.org/web/19980207005715/www.cardex.com/default.htm (last visited Sep. 27, 2004).
CardEx Incentives, http://www.cardex.com/incentivecard.htm (last visited Apr. 6, 1999).
CardEx Incentives, Incentives to Ease Your Company's Growing Pains, http://www.cardex.com/growingpainspr.htm (last visited Apr. 6, 1999).
CardEx, http://web.archive.org/web/19961031073435/http://www.cardex.com (last visited Sep. 27, 2004).
CardFlash, CardFlash Headlines, http://www.cardflash.com (last visited Apr. 5, 2005).
CEPSCO, Common Electronic Purse Specifications: Business Requirements (v. 6.0) (Dec. 1998).
CES/NaBANCO introduces stored value card technology; Blockbuster Video is first merchant partner, Bus. Wire, Jan. 15, 1996.
Charles R. Schwab, Now 7 Ways for a Better Total Return for Your Money (1987).
Christine Dugas, Payroll may ask: Paper or plastic?, USA Today, Aug. 14, 2001, at 3B.
Compliance: An Exercise in Risk Management, Compliance Action, Apr. 1996, available at http://www.bankersonline.com/articles/v01n07/v01n07a1.html.
D.B. Glossman, Investext Citicorp—Company Report, Oct. 12, 1995.
D.C. Area Safeway Stores Look for Increase in Sales Volume and Revenue with Cards, Card News, Dec. 30, 1991.
David Bank, Cash, check, charge—what's next?, Seattle Times, Mar. 6, 1995, at D-1.
Debit Card Innovation, Consumer Trends, May 1997, at 2.
Debit cards: Payroll Card Ups Fees, Am. Banker, Oct. 6, 1997, at 18.

Don Clark, Microsoft, Visa to Jointly Develop PC Electronic-Shopping Software, Wall St. J., Nov. 9, 1994, at B9.

Donal O'Mahony et al, Electronic Payment Systems, pp. 7-11 (2d ed. 1997).

Donald E. Neumann, An Enhanced Neural Network Technique for Software Risk Analysis, IEEE Trans. Software Engineering (Sep. 2002).

ECard, http://www.ergecard.com (last visited Feb. 23, 2001).

Electronic Purse can free you from ATM Draft, Bus. Times, Feb. 23, 2001, available at http://www.btimes.co.za/99/0411/btmoney/money07.htm.

Electronic Purse Card' to be Launched Tomorrow, New Straits Times, Sep. 18, 1999, available at http://www.meps.com.my/contents/news/0918nst.html.

Emerson Brown et al, Purchasing card magic: Eli Lilly finds accounts payable flying high with plastic, Corp. Cashflow, Nov. 1994, at 28.

EuroPay International, Proton World and Europay to Co-operate in Creation of New CEPS-Compliant E-Purse Application (press release), Jun. 28, 1999, available at http://www.europay.com/press/Prrl_1999_17.html.

European Commission CORDIS, Purse Application for Cross Border Use in euro, PACE IST-1999-11531, http://www.cordis.lu/ist/projects/99-11531.htm (last visited Feb. 23, 2001).

E-ZPass Regional Consortium, http://www.ezpass.com (last visited Nov. 12, 2001).

FDIC General Counsel's Opinion No. 8—Stored Value Cards, 61 Fed. Reg. 40,490 (Aug. 2, 1996).

First Data markets stored-value cards, Cards Int'l, Jan. 30, 1996, at 5.

First Union Issues Smart Cards to Fort Benning Recruits, CardFAX, Mar. 26, 1999.

First USA, First USA Platinum Connect Card (promotional material; terms and conditions) (1997).

FirstUSA, First USA Platinum Connect Card (marketing materials and Terms & Conditions) (1998).

Gerald Stuber, The Electronic Purse: An Overview of Recent Developments and Issues (Tech. Report No. 74), Bank of Can. (Jan. 1996), available at http://www.bankofcanada.ca/en/res/tr74-e.htm.

Gerry Vandenengel, Cards on the Internet: Advertising on a $3 Bill, Word Card Tech., Feb. 1995, at 46.

Hoover's Inc., General Mills, Inc. Company Record, http://cobrands.hoovers.com/global/cobrands/proquest/history.xhtml?COID=10639 (last visited Jul. 12, 2005).

International Computers Limited, Understanding the benefits—SMARTCITY offers a number of important benefits to both the card issuers and their customers, http://www.icl.com/smartcards/benefits.htm (last visited Feb. 27, 2001).

Jana Sanchez-Klein, 'Electronic purse' alliance planned, ComputerWord, Jul. 29, 1998.

Jeffrey Kutler, Cash Card Creator Looking Beyond Mondex, Am. Banker, Feb. 9, 1995, at 16.

Jeffrey M. Lacker, Stored value cards: costly private substitutes for government currency, 82 Econ. Q. 1 (Summer 1996).

Jim Hight, Strategies and Tactics, http://web.archive.org/web/19970124202934/http://www.strategies-tactics.com/services.htm (1997).

* cited by examiner

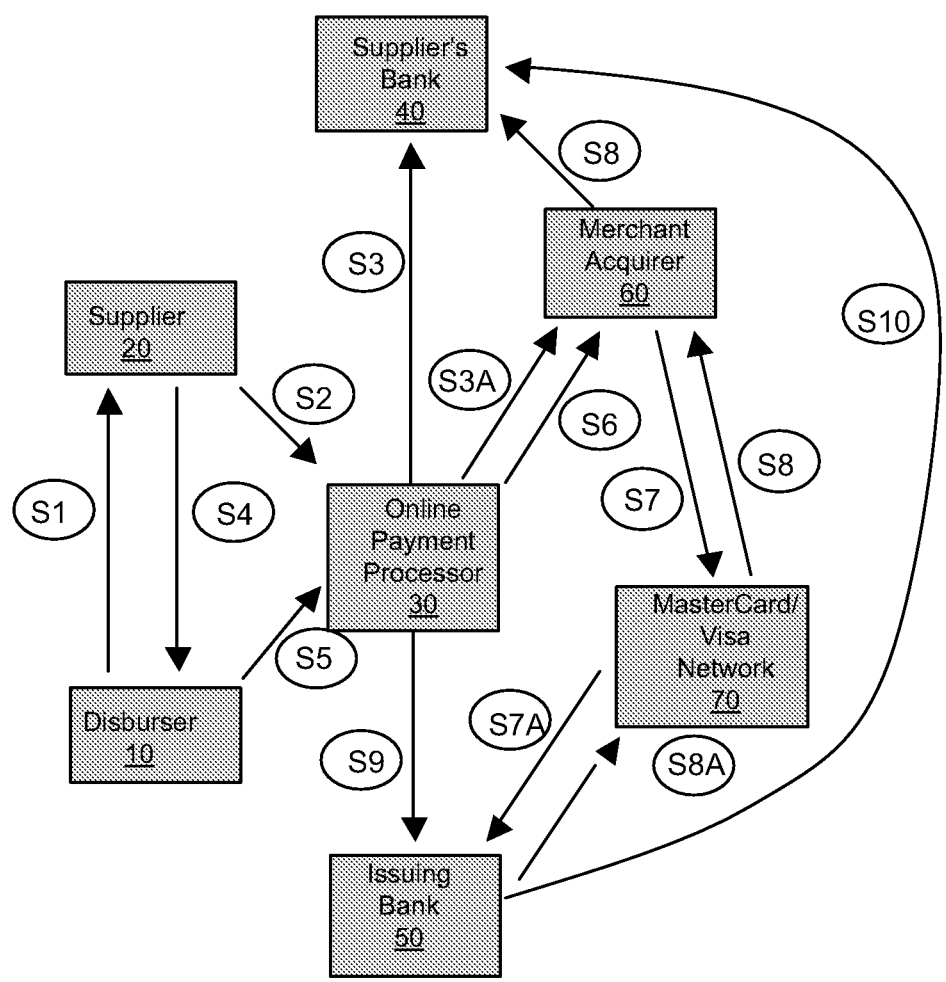

VARIABLE RATE PAYMENT CARD

FIELD OF THE INVENTION

Embodiments of the invention relate generally to credit and payment cards, and, in particular, to payment arrangements related to credit and payment cards in a business to business environment.

BACKGROUND OF THE INVENTION

In many business to business scenarios involving buyers (disbursers) and suppliers (merchants), the buyers still pay via check (paper), and suppliers have to wait a full thirty days, or typically, longer, to get paid. Such buyer-merchant relationships can benefit from the use of payment by electronic means, and earlier payments to the sellers.

The buyers, however, are reluctant to make use of card payment systems, because payment by check allows for greater control of payments, with less risk of fraud. Due to their risk-averse nature, commercial buyers tend to prefer the additional control, and fraud protection, afforded by check payments. In addition, buyers prefer to be able to control the time at which payment is made, so that cash flow and account balances can be properly maintained. Buyers typically enjoy the ability to maintain a "float" by delaying payment via check payments. In such scenarios, the buyer (disburser) orders goods from a supplier (merchant). The supplier then sends the goods, along with an invoice. The buyer then compares what has been ordered with what has been received, and, upon a satisfactory review, the invoice is approved, and a check can be issued. Such control is not allowed by typical merchant card payment systems.

Such buyers suffer, however, from inefficiencies involved with the use of paper payments, and leave cash on the table which could result from earlier payments.

Thus, there is a need for an improved systems and methods for providing improved payment arrangements related to credit and payment cards.

SUMMARY OF THE INVENTION

Embodiments of the invention are directed to these and other needs. Embodiments of the invention can include systems and methods of paying for transactions via a variable rate payment card scheme.

Embodiments are directed to systems and methods whereby a variable rebate is given for payment card purchases, based on how quickly payment is authorized.

A method of arranging for payment of a purchase includes receiving, from a supplier, agreement to accept a payment from a buyer via use of a payment card having variable payment terms; after a purchase by the buyer from the supplier, assessing the supplier a standard interchange rate; receiving, from the buyer, approval to pay the invoice; and issuing, to the supplier, a rebate, based upon when the approval to pay the invoice was received. The variable payment terms can be calculated by: determining a first early payment date; determining a second standard payment date; assessing against the supplier a first percentage of the standard interchange rate if the invoice is approved by the first early payment date; and assessing against the supplier a second percentage of the standard interchange rate if the invoice is approved on or after the second standard payment date.

A benefit to the supplier in this scenario is that electronic payment with cash can be accelerated in time with the amount of the interchange. The interchange can be adjusted by an amount being proportional (or related to) to the number of days the cash is accelerated.

Such buyers can benefit from the migration from checks to electronic payments, plus some level of payment card rebate, also proportional to the number of days cash is accelerated to the supplier. The buyer can be motivated to approve and pay invoices as early as possible, to increase the level of rebate captured. This, in turn, benefits suppliers interested in cash accelerated at modest incremental cost.

BRIEF DESCRIPTION OF THE DRAWINGS

The present invention will be more readily understood from the detailed description of exemplary embodiments presented below considered in conjunction with the attached drawings, of which:

FIG. 1 illustrates a payment card scenario in accordance with embodiments of the present invention.

It is to be understood that the attached drawings are for purposes of illustrating the concepts of the invention.

DETAILED DESCRIPTION OF THE INVENTION

Aspects of the invention are directed to systems and methods for providing a payment card whereby a variable rebate is given for payment card, based on how quickly payment is authorized. In the closed loop network of certain embodiments, a full interchange rate is charged up front, as with a traditional interchange, but, in some embodiments, a portion of that interchange may be rebated back to the supplier by the card issuing bank, based on the length of time it takes for the buyer to approve the underlying invoices for payment. As is known to those of skill in the art, an interchange is a fee, typically paid by an acquiring bank/merchant bank to the issuing bank. The fee is meant to compensates the issuer for the time after settlement with the acquiring bank/merchant bank and before it recoups the settlement value from the cardholder.

By way of embodiments of the invention, a merchant/supplier is assessed the standard interchange rate if the associated invoice is approved and payment is initiated within a first predetermined number of days, and a reduced interchange rate if payment is not made until a second predetermined number of days, or later. Thus each day delay beyond the first predetermined number of days in initiating payment results in a reduction in net interchange.

A benefit to the supplier in this scenario is that electronic payment with cash can be accelerated in time with the amount of the interchange. The interchange is thus adjusted in a manner being somewhat proportional to (or related to) the number of days the cash is accelerated.

FIG. 1 illustrates a payment card scenario in accordance with embodiments of the invention. In step S1, a Disburser (payer) 10 gets Supplier (merchant) 20 to accept payment via a purchasing card with variable (or dynamic) interchange terms. The Disburser 10 will be able to induce the supplier 20 to accept such payment terms if, for example, the payer is a large account, or otherwise has commercial leverage over the Supplier 20. In step S2, the Supplier 20 enrolls in an Online Payment Processor 30 service to enable such payment with variable (or dynamic) interchange terms. As part of this online enrollment process, the Supplier 20 provides its Merchant Acquiring number, as is known to those of skill in the art, and Bank Demand Deposit Account (DDA) number. (As is known to those of skill in the art, a DDA is an account from which deposited funds can be withdrawn at any time without any notice to the depository institution. Most checking and savings accounts are demand deposits, accessible by the account holder at any time). In step S3, The Online Payment Processor 30 contacts the Merchant Acquirer 60 and the Supplier's Bank 40, respectively, to verify these numbers.

In step S4, the Supplier 20 sends an invoice to the Disburser 10 with a stated invoice due date and net terms (e.g., day 30). In step S5, the Disburser 10 approves payment for the invoice and sends a payment file to the Online Payment Processor 30, which contains a dummy Merchant Acquiring number.

In step S6, the Online Payment Processor 30 overlays an actual Merchant Acquiring number and acts as a virtual point of sale (POS) terminal which generates a standard card payment authorization request which gets sent to the Merchant Acquirer 60. In step S7, the Merchant Acquirer 60 sends a payment authorization request to the Issuing Bank 50 via the MasterCard/Visa network 70. In step S8, the Issuing Bank 50 approves the authorization request back to Merchant Acquirer 60 via a MasterCard/Visa network (or other such credit card network) 70 and payment funds get deposited to the Supplier's Bank 40.

In step S9, following successful authorization of the payment, the Online Payment Processor 30 calculates the number of days between the day on which the payment was authorized/settled and the due date on the invoice. If the card settlement date precedes the invoice date, then the Online Payment Processor 30 calculates the interchange rebate due back to the supplier at a "daily interchange rebate rate." The Online Payment Processor 30 then generates an automatic clearinghouse (ACH) debit file which debits a house demand deposit account (DDA) owned by the Issuing Bank 50 for the calculated rebate amount.

In step S10, this ACH file gets sent to the Issuing Bank's 50 ACH department for processing, as is known to those of skill in the art, which results in the Supplier's Bank 40 being credited with funds equal to the calculated rebate amount and the Issuing Bank's 50 house DDA being debited for the same.

In some embodiments, at the time of enrollment (initiation of the account relationship) the Supplier 20 and Disburser 10 agree on card payment terms inclusive of an interchange rebate. As used herein, the "daily interchange rebate rate" is calculated as the difference between an "earliest payment date" (e.g., day ten after invoice issuance) and the invoice due date (e.g., day thirty, or other mutually agreed upon date). For example, for terms of 2.2% on day ten and 1.0% on day thirty, the "daily interchange rebate rate" would be 1.2% divided by twenty days, or 0.06%. Other daily interchange rates can be used at would be known to those of skill in the art, as informed by the present disclosure. In addition, the terms of the transaction can also be related to the size and/or quantity of the order.

In use, in some embodiments, a payment card settlement product can be implemented as follows.

Suppliers 20 can enroll in an online closed-loop network involving a merchant acquirer 60 and an online payment processing application 30. Payments in this closed loop network are uniquely identified, and thus, can be treated differently than other card transactions. The unique identifier can be, for example, a predefined number or pool of numbers or digits related to, or that are a part of, the payment card number.

Merchants/suppliers 20 can enroll online and either (1) authorize the network to act as a virtual point of sale ("POS") terminal to initiate payments from participating buyers/clients in the network; or (2) initiate payments from participating buyers/clients in the network using their own POS terminals.

In general, in some embodiments, features of the interchange on the closed loop network more closely align cost and benefit as compared to a traditional interchange. (As is known to those of skill in the art, interchange fees are fees charged between businesses as part of the operation of credit card networks). By way of non-limiting example, a traditional interchange is fixed at a level of approximately 2.20% plus merchant acquiring fees, regardless of when payment is initiated. In contrast, by way of embodiments of the invention, the full 2.20% is charged up front, as with traditional interchange, but a portion of that interchange may be rebated back to the supplier 20 by the card issuing bank 50 based on the length of time it takes for the buyer to approve the underlying invoices for payment.

In one example, a supplier 20 agrees to accept payment via payment card with terms of "2.20/10, 1.00/30." These terms mean that the merchant/supplier 20 would be assessed the standard interchange of 2.20% if the associated invoice is approved and payment is initiated within ten days, and a net interchange of only 1.00% if payment is not made until day thirty or later. Thus, each day delay beyond day ten in initiating payment results in a reduction in net interchange of 0.055%. A ten day delay would result in a net reduction of 0.550% or net interchange of 1.65% versus the standard 2.20%.

As the transaction in this example is continued, upon invoice approval, which in this example occurs on day twenty, the online payment processing application 30 automatically initiates settlement via payment card and the supplier is assessed an interchange of 2.20% using standard merchant acquiring processes and rails (i.e., infrastructure). At the same time, a credit equivalent to 0.55% is initiated by the issuing bank back to the merchant/supplier, either directly via the ACH network, or via the merchant acquirer 60. This 0.55% reflects the ten day delay in approving the invoice and initiating payment resulting in net interchange of 1.65% to the supplier 20.

A benefit to the supplier in this scenario is electronic payment with cash accelerated up to twenty days with the amount of the interchange being somewhat proportional to the number of days of cash is accelerated. The minimum 1.00% interchange for payment at day thirty or later would be required to compensate the issuing bank and card association (e.g. Visa/MasterCard, etc.) for costs incurred by initiating electronic payment via the payment card method described herein. (It is assumed that this 1.00% discount would be acceptable to a significant percentage of suppliers 20, even with no cash acceleration, to the other above-described benefits).

A benefit to the buyer in this scenario is migration from checks to electronic payments, plus some level of payment card rebate, also proportional to the number of days cash is accelerated to the supplier. The buyer is therefore motivated to approve and pay invoices as early as possible, to increase the level of rebate captured. This, in turn, benefits suppliers interested in cash accelerated at modest incremental cost (e.g., 1.00% at day thirty versus. 2.20% at day ten or earlier). In some embodiments, a rebate can also be issued to the buyer, thus providing additional motivation for the buyer to use the system. The rebate to the buyer can also be based on accelerated payment, thus providing additional incentive to pay the supplier quickly.

By way of embodiments of the invention, the issuing bank 50 benefits when payments are made via payment cards as opposed to other payment methods due to the capture of some level of net interchange which is pre-determined by the card associations (e.g., Visa/MasterCard, etc.) for payments made via the unique closed-loop network of the invention. The issuing bank 50 could also benefits by having a unique and superior value proposition versus all other payment card providers.

In accordance with the invention, other payment schedules and interchange rates can be used, as would be known to one of skill in the art, as informed by the present disclosure.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A system for arranging for payment of a purchase comprising:
   a processor;
   a memory;
   an application stored in the memory of the system and executable by the processor, wherein the application functions to:
      receive from a supplier an agreement to accept a payment from a buyer via use of a payment card having variable payment terms;
      receive from the supplier a demand deposit account number associated with a demand deposit account of the supplier;
      enroll the supplier in a payment network;
      issue a unique identifier to payments issued to suppliers enrolled in the payment network;
      receive authorization from the supplier to either (i) authorize the payment network to act as a virtual point of sale terminal to initiate payments from buyers enrolled in the payment network or (ii) initiate payments from buyers enrolled in the payment network using the supplier's point of sale terminal;
      after a purchase by the buyer from the supplier, assess the supplier a standard interchange rate;
      receive from the buyer an approval to pay the invoice
      initiate payment from the buyer to the supplier; and
      issue a rebate to the demand deposit account of the supplier based upon when the approval to pay the invoice was received.

2. The system of claim 1, wherein the application further functions to calculate the variable payment terms by:
   determining a first early payment date;
   determining a second standard payment date;
   assessing against the supplier a first percentage of the standard interchange rate if the invoice is approved by the first early payment date; and
   assessing against the supplier a second percentage of the standard interchange rate if the invoice is approved on or after the second standard payment date.

3. The system of claim 2, wherein the application functions to further calculate the variable payment terms by:
   reducing the percentage of the standard interchange rate assessed against the supplier by a proportion of the time that an invoice is approved between the first early payment date and the second standard payment date.

4. The system of claim 1, wherein the application further functions to:
   receive from a supplier, at a programmed computer, an authorization to act as a virtual point of sale terminal to initiate payments from the buyer.

5. The system of claim 1, wherein the application further functions to:

receive from a supplier, at a programmed computer, an authorization to initiate payments from the buyer using point of sale terminals of the buyer.

6. A system for arranging for payment of a purchase comprising:
   a processor;
   a memory;
   an application stored in the memory of the system and executable by the processor, wherein the application functions to:
      receive from a supplier an agreement to accept a payment from a buyer via use of a payment card having variable payment terms;
      receive from the supplier a demand deposit account number associated with a demand deposit account of the supplier;
      enroll the supplier in a payment network;
         issue a unique identifier to payments issued to suppliers enrolled in the payment network;
         receive authorization from the supplier to either (i) authorize the payment network to act as a virtual point of sale terminal to initiate payments from buyers enrolled in the payment network or (ii) initiate payments from buyers enrolled in the payment network using the supplier's point of sale terminal;
         after a purchase by the buyer from the supplier, assess the supplier a predetermined interchange rate;
         receive from the buyer an approval to pay the invoice;
         initiate payment from the buyer to the supplier; and
         issue a rebate to the demand deposit account of the supplier based upon when the approval to pay the invoice was received.

7. The system of claim 6, wherein the application further functions to calculate the variable payment terms by:
   determining a first payment date;
   determining a second payment date;
   assessing against the supplier a first percentage of the predetermined interchange rate if the invoice is approved by the first payment date; and
   assessing against the supplier a second percentage of the predetermined interchange rate if the invoice is approved on or after the second payment date.

8. The system of claim 7, wherein the application functions to further calculate the variable payment terms by:
   reducing the percentage of the standard interchange rate assessed against the supplier by a proportion of the time that an invoice is approved between the first early payment date and the second standard payment date.

9. A system for processing payment from a buyer to a supplier by way of a payment card comprising:
   a processor;
   a memory;
   an application stored in the memory of the system and executable by the processor, wherein the application functions to:
      receive from the buyer an agreement to pay the supplier via use of the payment card having variable payment terms;
      receive from the supplier a demand deposit account number associated with a demand deposit account of the supplier;
      enroll the supplier in a payment network using;
         issue a unique identifier to the payment card, wherein the unique identifier indicates the payment card is part of the payment network;
         receive authorization from the supplier to either (i) authorize the payment network to act as a virtual point of sale terminal to initiate payments from buyers enrolled in the payment network or (ii) initiate payments from buyers enrolled in the payment network using the supplier's point of sale terminal;

after a purchase by the buyer from the supplier, assess the supplier a standard interchange rate;

after a purchase by the buyer from the supplier, assess the supplier a predetermined interchange rate;

receive from the buyer an approval to pay the invoice;

initiate payment from the buyer to the supplier; and issue a rebate to the demand deposit account of the supplier based upon when the approval to pay the invoice was received.

10. The system of claim 9, wherein the application further functions to calculate variable payment terms by:

determining a first payment date;

determining a second payment date;

assessing against the supplier a first percentage of the predetermined interchange rate if the invoice is approved by the first payment date; and assessing against the supplier a second percentage of the predetermined interchange rate if the invoice is approved on or after the second payment date.

11. The system of claim 10, wherein the application functions to further calculate variable payment terms by:

reducing the percentage of the standard interchange rate assessed against the supplier by a proportion of the time that an invoice is approved between the first early payment date and the second standard payment date.

12. The system of claim 9, wherein the application further functions to:

receive from a supplier, at a programmed computer, an authorization to act as a virtual point of sale terminal to initiate payments from the buyer.

13. The system of claim 9, wherein the application further functions to:

receive from a supplier, at a programmed computer, an authorization to initiate payments from the buyer using point of sale terminals of the buyer.

* * * * *